(No Model.) 2 Sheets—Sheet 1.
G. G. HASBROUCK.
BICYCLE.
No. 516,435. Patented Mar. 13, 1894.
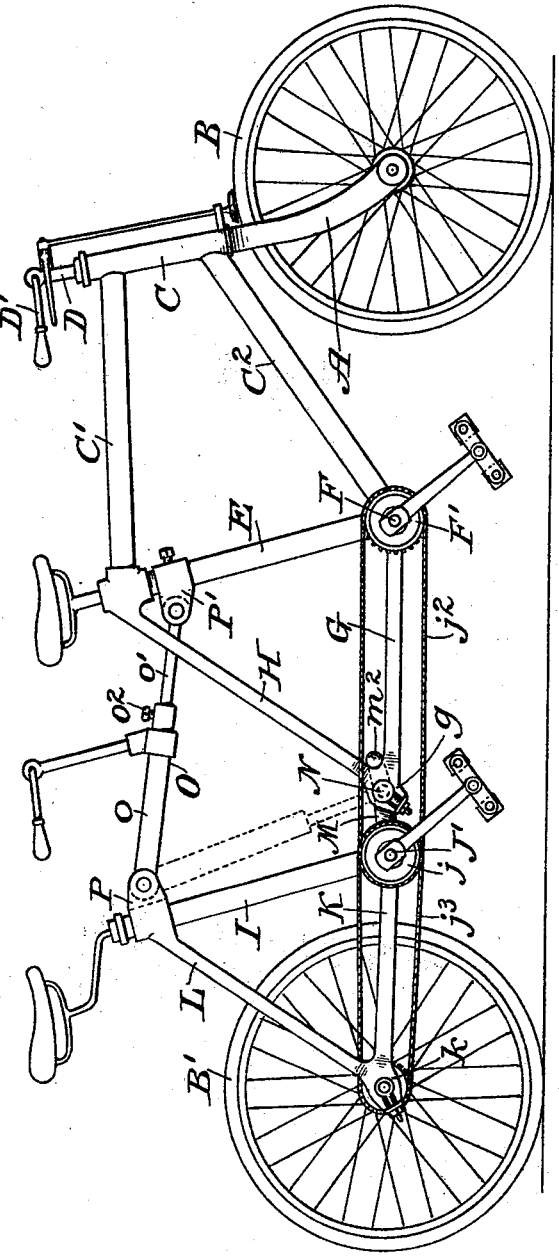
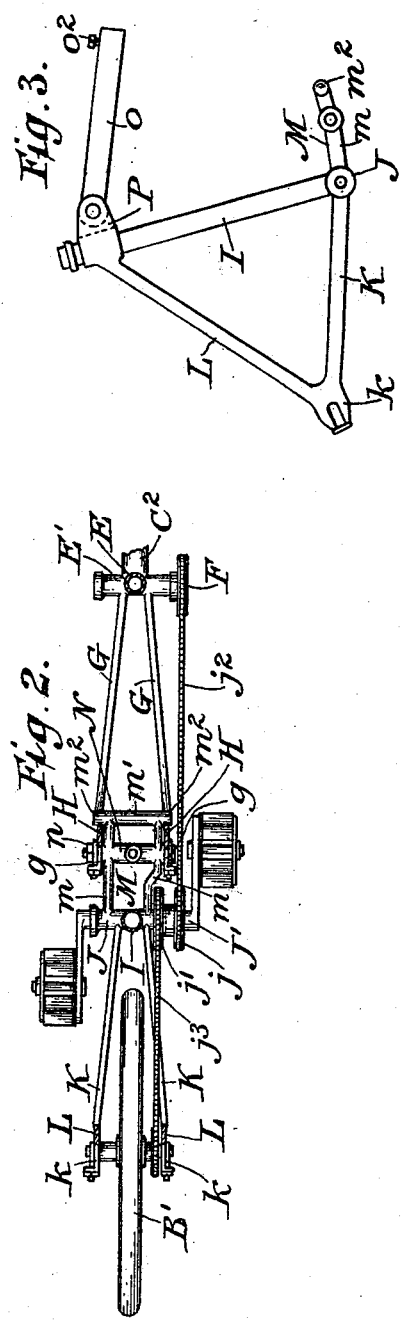
Witnesses:
Geo. Wadman.
A. N. Jesbera.
Inventor:
George G. Hasbrouck
by William B. Greeley
Att'y.

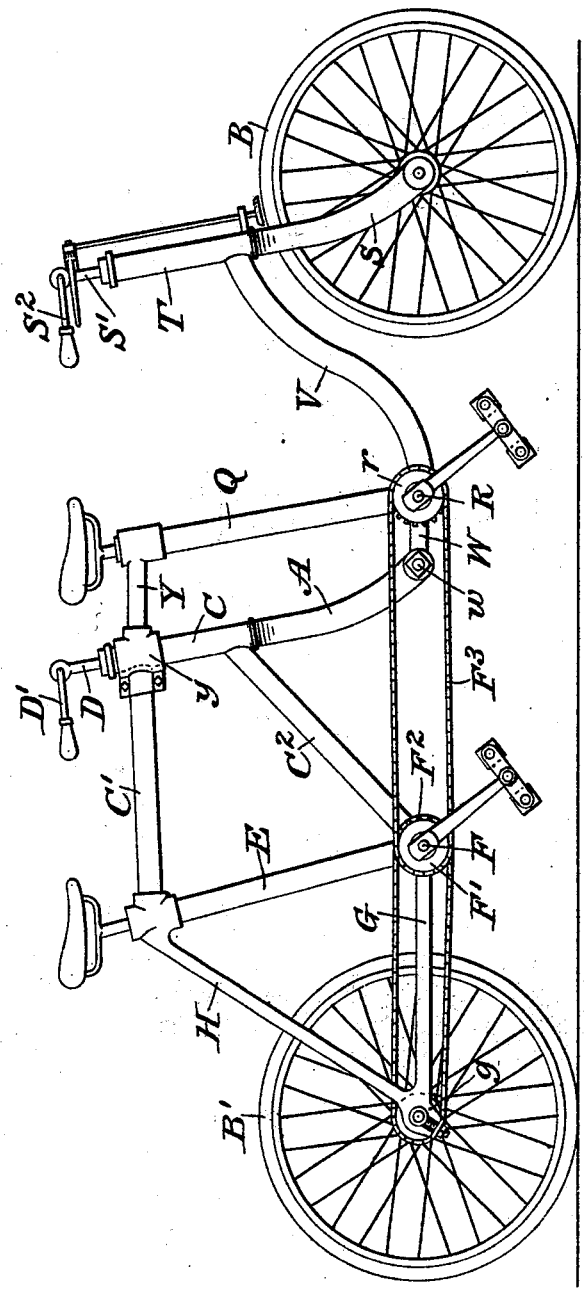

UNITED STATES PATENT OFFICE.

GEORGE G. HASBROUCK, OF NYACK, NEW YORK.

BICYCLE.

SPECIFICATION forming part of Letters Patent No. 516,435, dated March 13, 1894.

Application filed November 24, 1893. Serial No. 491,829. (No model.)

*To all whom it may concern:*

Be it known that I, GEORGE G. HASBROUCK, of Nyack, in the county of Rockland and State of New York, have invented certain new and useful Improvements in Bicycles; and I do hereby declare that the following is a full and exact description thereof, reference being had to the accompanying drawings, and to the letters of reference marked thereon, making a part of this specification.

This invention relates particularly to bicycles of the "safety" type and the special object is to permit any ordinary single bicycle of this type to be converted readily to a tandem or bicycle for two riders. Various attempts have been made in this direction heretofore but so far as I am aware they have involved a special construction of the frame of the single bicycle, adding to the weight and to the cost thereof, and requiring of the user the purchase in the outset of a special bicycle if he contemplates the possibility of desiring to convert it into a bicycle for two riders.

My invention consists in an attachment adapted to be applied readily to any ordinary safety bicycle now on the market without requiring modification of the frame thereof, without requiring the use of a third wheel and without requiring the frame to be taken apart.

In the accompanying drawings: Figure 1 is a side elevation of a bicycle provided with one form of my attachment, whereby it is adapted for two riders. Fig. 2 is a partial horizontal section of the bicycle shown in Fig. 1 on a plane above the upper members of the sprocket chains, the rear wheel being shown in plan view. Fig. 3 is a side elevation of the supplementary frame by itself; and Fig. 4 is a side elevation of a bicycle having the improved attachment applied in front, the construction of the attachment being modified for this purpose.

I have shown in Figs. 1 and 4 of the drawings and in part in Fig. 2 a frame of a single bicycle constructed in an ordinary manner and representing in its main features most of the forms now upon the market. This frame comprises a front fork A in which the front wheel B is or may be supported, a sleeve C in which is journaled the steering rod D having the fork A secured to one end and the handle D' to the other, a seat-pillar standard E having at its lower end the fork E' in which is journaled the crank shaft F having the usual sprocket wheel F', the brace bars C' and C² extending from the sleeve C to the seat-pillar E and the fork E', the horizontal bars G, G, and the brace bars H, H, the bars G, G, having at their ends the forks $g, g$, which support the shaft of the rear wheel B'. It will be understood however that this main frame is shown merely to illustrate the application of my invention, which is independent of the particular form or construction of said main frame.

My invention is embodied, as before noted, in a supplementary frame which is adapted to be applied to the frame of any ordinary bicycle of the type referred to, for the purpose of converting a single bicycle into one for two riders. The general construction of this supplementary frame may be varied as desired, but I prefer to make it as represented in Figs. 1, 2 and 3, substantially like the main frame with a seat-pillar standard I having at its lower end a fork J in which a crank shaft J' may be journaled, horizontal bars K, K, and brace bars L, L, the rear ends of the bars K, K, having forks $k, k$, in which the shaft of the rear wheel B' may be adjustably supported in the usual manner. The front lower portion of the supplementary frame is provided with an extension M which is adapted to engage the rear part of the main frame. Preferably this extension consists of two bars $m, m$, secured to the fork J and bearing at their outer ends a cross bar $m'$ which projects beyond the bars $m, m$, to form lateral projections $m^2, m^2$, which may be engaged in the crotches between the bars G, G, and H, H, of the main frame to support the same. A cross rod N is also carried by the supplementary frame, preferably by the extension M thereof and is adapted to rest against or in the forks $g, g$, of the main frame, the projections $m^2, m^2$, and the cross rod N being so disposed with reference to each other and to the front or main frame as to support the weight which may be placed upon the bicycle and thereby to effect a very strong and rigid union between the two parts of the frame. The rod N may be fixed permanently to the extension M or it may be arranged to be withdrawn if desired, and it is provided at one end with a head and at the other with a screw-thread and nut, as at $n$, whereby, after the union of the two frames is effected, the two parts of the front or main frame may be drawn together closely upon the extension M to prevent accidental disengagement. To further brace the compound frame, if required, a rod O may be attached to the seat-pillar standards E and I, the rod being preferably composed of two telescoping sections $o$ and $o'$ held in an adjusted position by a set screw $o^2$. The rod is also by preference pivoted to the clamp P which secures it to the standard I, so that it may be dropped into the position indicated by dotted lines in Fig. 1 and secured to the cross rod N when the rear seat of the bicycle is to be occupied by a lady. It may also be secured to the front standard E in a similar manner by a suitable clamp P'.

The driving mechanism may be arranged to be operated by either or both of the two riders. As represented in the drawings it is arranged to be operated by both, a crank shaft J' being journaled in the fork J and having two sprocket wheels $j$ and $j'$ fixed thereon, one being geared by a chain $j^2$ to the sprocket wheel on the front crank shaft and the other by a chain $j^3$ to the sprocket wheel of the rear wheel B'.

The supplementary frame described above and illustrated in Figs. 1, 2 and 3 of the drawings is adapted to be secured to the rear of the main frame. In some cases it will be found desirable to provide for the attachment of the supplementary frame in front of the main frame, particularly when the seat of the supplementary frame is to be occupied by a lady. I have illustrated such an application of my invention in Fig. 4 of the drawings, in which figure the main frame is represented as like that shown in Fig. 1 and in which the same letters of reference are used to indicate like parts. The supplementary frame in this case comprises a seat-pillar standard Q, having at its lower end a fork to receive the crank shaft R, a front fork S to receive the front wheel B when removed from the front fork of the main frame, a steering rod S' and handle S², a sleeve T to receive the steering rod, and a suitable connection between the sleeve T and the standard Q, the connection being shown as a drop-bar V. The supplementary frame is provided with an extension W, which is adapted to engage the main frame and to form a rigid connection therewith, the said extension being conveniently secured to the front fork A of the main frame by a bolt $w$ which is passed through the bearings from which the shaft of the front wheel has been removed. The connection is also stiffened by a rod Y which is secured to the seat-pillar standard Q and bears at its end a clamp $y$ which is adapted to embrace the sleeve C and the brace rod C' of the main frame. To arrange the driving gear for operation by both riders a second sprocket wheel F² may be secured on the crank shaft F and connected by a chain F³ to the sprocket wheel $r$ on the crank shaft R.

It will be understood that I do not intend to limit my invention to the particular constructions and arrangements of the supplementary frames which are illustrated in the drawings.

I am aware that it has been proposed heretofore to provide a supplementary frame which has a wheel at its rear end and at its front end rests upon and is wholly supported by the axle of the rear wheel of the main frame, whereby the compound or tandem bicycle must have three wheels and must be proportionately heavy and awkward. I believe however that I am the first to provide a supplementary frame having both a support for a saddle and a support for a wheel, and having at least two points or lines of bearing upon or attachment to an ordinary main frame, whereby the compound frame forms a truss which supports the riders without requiring the use of a third, intermediate wheel and whereby the attachment is adapted to be applied to any bicycle of ordinary construction without requiring any modification thereof except the removal of one of the wheels from its original support to the support therefor in the supplementary frame.

I claim as my invention—

1. In a bicycle, the combination with a main frame having a support for a seat and supports for two wheels, of a supplementary frame also having a support for a saddle and having a support for a wheel, and having two lines of bearing upon the main frame and means to couple said supplementary frame to said main frame in place of one of the wheels thereof, whereby the compound frame forms a truss requiring no intermediate support, substantially as shown and described.

2. In a bicycle, the combination with a main frame having a support for a seat and supports for two wheels, of a supplementary frame also having a support for a saddle and a support for a wheel, an extension from one end of said supplementary frame, means to secure said extension to the adjacent wheel support of the main frame in place of its wheel, and a brace rod connecting the two frames, substantially as shown and described.

3. An attachment for a safety bicycle comprising a frame adapted to support a seat and having a bearing for a wheel, an extension from the forward part of said frame adapted to engage the frame of a bicycle from which the rear wheel has been removed and a cross rod carried by the first named frame and adapted to support the rear of the last named frame, substantially as shown and described.

4. An attachment for a safety bicycle comprising a frame adapted to support a seat and having a bearing for a wheel, an extension from the forward part of said frame having lateral projections adapted to rest upon the frame of a bicycle from which the wheel has been removed, and a cross bar carried by the first named frame and adapted to support the rear of the last named frame, substantially as shown and described.

5. An attachment for a safety bicycle comprising a frame adapted to support a seat and having a bearing for a wheel, an extension from the forward part of said frame adapted to be entered between the two parts of a bicycle frame from which the rear wheel has been removed and having lateral projections adapted to rest upon said frame, a cross rod carried by the first named frame and adapted to support the rear of the last named frame, and means to draw together the parts of said last named frame, substantially as shown and described.

6. An attachment for a safety bicycle comprising a frame adapted to support a seat and having a bearing for a wheel, an extension from the forward part of said frame adapted to engage and be supported by the frame of a bicycle from which the rear wheel has been removed, a cross-rod carried by said first named frame and adapted to support the rear of the last named frame, and a brace rod connected to the upper part of the first named frame and adapted to be connected to the last named frame, substantially as shown and described.

7. The combination with a bicycle frame having a crank shaft and sprocket wheel, of a supplementary frame adapted to support a seat and having a bearing for a wheel, said supplementary frame also having an extension adapted to engage and be supported by the main frame and a cross rod adapted to support the rear of the main frame, and means to transmit power from the sprocket wheel of the main frame to the wheel supported by the bearing of the supplementary frame, substantially as shown and described.

In testimony whereof I have signed my name to this specification in the presence of two subscribing witnesses.

GEORGE G. HASBROUCK.

Witnesses:
A. N. JESBERA,
A. WIDDER.